(12) United States Patent
Scott et al.

(10) Patent No.: US 10,896,002 B2
(45) Date of Patent: Jan. 19, 2021

(54) REVERSE DIRECTORY STRUCTURE IN A GARBAGE COLLECTION UNIT (GCU)

(71) Applicant: Seagate Technology LLC, Cupertino, CA (US)

(72) Inventors: Benjamin J. Scott, Longmont, CO (US); Steven S. Williams, Longmont, CO (US); Stephen H. Perlmutter, Louisville, CO (US); Ryan J. Goss, Prior Lake, MN (US); Daniel J. Benjamin, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 22 days.

(21) Appl. No.: 16/212,200

(22) Filed: Dec. 6, 2018

(65) Prior Publication Data

US 2020/0004461 A1 Jan. 2, 2020

Related U.S. Application Data

(60) Provisional application No. 62/691,714, filed on Jun. 29, 2018.

(51) Int. Cl.
| | |
|---|---|
| *G06F 12/00* | (2006.01) |
| *G06F 3/06* | (2006.01) |
| *G06F 11/10* | (2006.01) |
| *G06F 12/02* | (2006.01) |
| *G06F 13/00* | (2006.01) |
| *G06F 13/28* | (2006.01) |

(52) U.S. Cl.
CPC .......... *G06F 3/0659* (2013.01); *G06F 3/0613* (2013.01); *G06F 3/0619* (2013.01); *G06F 3/0656* (2013.01); *G06F 3/0679* (2013.01); *G06F 11/1004* (2013.01); *G06F 12/0253* (2013.01); *G06F 2212/1044* (2013.01)

(58) Field of Classification Search
CPC .... G06F 3/0659; G06F 3/0613; G06F 3/0679; G06F 11/1004; G06F 12/0253; G06F 3/0656; G06F 2212/1044
See application file for complete search history.

(56) References Cited

U.S. PATENT DOCUMENTS

| | | |
|---|---|---|
| 7,739,576 B2 | 6/2010 | Radke |
| 7,809,994 B2 | 10/2010 | Gorobets |
| 7,844,772 B2 | 11/2010 | Moon et al. |
| 7,877,541 B2 | 1/2011 | Norman |

(Continued)

*Primary Examiner* — Mark A Giardino, Jr.
(74) *Attorney, Agent, or Firm* — Hall Estill Attorneys at Law (57) ABSTRACT

Apparatus and method for managing metadata in a data storage device such as a solid-state drive (SSD). In some embodiments, a write stream is formed of user data blocks to be sequentially written to a non-volatile memory (NVM). An entry of a reverse directory footer is generated for each user data block in the write stream to describe a physical address in the NVM at which the corresponding user data block is to be stored. The entries are accumulated in a buffer memory until the total count of entries reaches a predetermined threshold and a complete footer data structure is formed. The complete footer data structure is thereafter inserted into the write stream for writing, with the data blocks, to the NVM. The complete footer data structure has an overall size that corresponds to an overall size of each of the user data blocks.

20 Claims, 5 Drawing Sheets

(56) References Cited

U.S. PATENT DOCUMENTS

| | | |
|---|---|---|
| 8,001,450 B2 | 8/2011 | Onishi et al. |
| 8,255,617 B2 | 8/2012 | Goss et al. |
| 8,364,886 B2 | 1/2013 | Goss |
| 8,448,045 B2 | 5/2013 | Reddy et al. |
| 8,914,597 B2 | 12/2014 | Benhase et al. |
| 9,201,728 B2 | 12/2015 | Patapoutian et al. |
| 9,244,766 B2 | 1/2016 | Patapoutian et al. |
| 9,274,882 B2 | 3/2016 | Camp et al. |
| 9,430,329 B2 | 8/2016 | Trantham |
| 9,559,725 B1 | 1/2017 | Shao et al. |
| 9,905,294 B1 | 2/2018 | Canepa et al. |
| 10,437,670 B1 * | 10/2019 | Koltsidas ............... G06F 3/0656 |
| 2003/0163631 A1 * | 8/2003 | Aasheim ............ G06F 12/0246 711/103 |
| 2009/0132620 A1 | 5/2009 | Arakawa |
| 2011/0231597 A1 | 9/2011 | Lai et al. |
| 2016/0299724 A1 * | 10/2016 | Vanaraj ............... G06F 11/1076 |
| 2017/0329532 A1 | 11/2017 | Goss et al. |
| 2018/0024897 A1 * | 1/2018 | Cai .................... G06F 11/1666 714/6.12 |
| 2018/0089088 A1 * | 3/2018 | Jakowski ............ G06F 12/0607 |
| 2018/0239697 A1 * | 8/2018 | Huang ................ G06F 12/0246 |
| 2018/0275899 A1 | 9/2018 | Munsil et al. |

\* cited by examiner

FORWARD MAP

FIG. 7

REVERSE DIRECTORY

REVERSE DIRECTORY STRUCTURE IN A GARBAGE COLLECTION UNIT (GCU)

RELATED APPLICATION

The present application makes a claim of domestic priority to U.S. Provisional Patent Application No. 62/691,714 filed Jun. 29, 2018, the contents of which are hereby incorporated by reference.

SUMMARY

Various embodiments of the present disclosure are generally directed to the management of metadata in a non-volatile memory, such as through the writing of just-in-time reverse directory footers in solid state drive (SSD) data structures.

In some embodiments, a write stream is formed of user data blocks to be sequentially written to a non-volatile memory (NVM) each user data block having X kilo-bytes of user data. An entry of a reverse directory footer is generated for each user data block in the write stream to describe a physical address in the NVM at which the corresponding user data block is to be stored, each entry having X bytes of footer data. The entries are accumulated in a buffer memory until the total count of entries reaches 1024 entries, forming a complete footer data structure. The complete footer data structure is thereafter inserted into the write stream for writing, with the data blocks, to the NVM.

In other embodiments, an apparatus has a non-volatile memory (NVM) comprising a plurality of semiconductor memory dies. A data manager circuit is configured to form a write stream of user data blocks to be written to a garbage collection unit (GCU) of the NVM. A reverse directory manager circuit is configured to generate an entry of a reverse directory footer for each user data block in the write stream to describe a physical address in the GCU at which the corresponding user data block is to be stored. A buffer memory is configured to accumulate the entries generated by the reverse directory manager circuit until a total predetermined number of entries is reached to form a complete footer data structure, after which the reverse directory manager circuit inserts the complete footer data structure into the write stream for writing to the GCU with the user data blocks. The complete footer data structure has an overall size that corresponds to an overall size of each of the user data blocks. A write circuit is configured to, responsive to receipt of the write stream, write a plurality of the complete footer data structures and the associated user data blocks to the GCU so that each successive pair of first and second complete footer data structures are separated by an intervening number of user data blocks described by the second complete footer data structure.

In further embodiments, a solid-state drive (SSD) has a non-volatile memory (NVM) characterized as a flash memory comprising a plurality of semiconductor memory dies. Each die comprises flash memory cells arranged into a plurality of erasure blocks with each erasure block constituting a smallest grouping of the flash memory cells that can be concurrently erased. A controller circuit is configured to form a garbage collection unit (GCU) by grouping together a selected erasure block from each of a subset of the dies in the NVM, the GCU being arranged to be allocated and erased as a unit to store user data. A data manager circuit is configured to form a write stream of user data blocks to be written to the GCU, each user data block having X total bytes of user data. A reverse directory manager circuit is configured to generate an entry of a reverse directory footer for each user data block in the write stream to describe a physical address in the GCU at which the corresponding user data block is to be stored, each entry having Y total bytes of map data. A buffer memory is configured to accumulate the entries generated by the reverse directory manager circuit until a total number of Z entries is reached to form a complete footer data structure where Z=X/Y. The reverse directory manager circuit is further configured to insert the complete footer data structure into the write stream for writing to the GCU with the user data blocks, the complete footer data structure having an overall size that corresponds to an overall size of each of the user data blocks.

These and other features which may characterize various embodiments can be understood in view of the following detailed discussion and the accompanying drawings.

DETAILED DESCRIPTION

Solid state drives (SSDs) are data storage devices that store user data in non-volatile memory (NVM) made up of an array of solid-state semiconductor memory cells. SSDs usually have an NVM module and a controller. The controller directs the transfer of user data between the NVM and a host device. The NVM will usually be NAND flash memory, but other forms of solid-state memory can be used.

NAND flash memory cells are arranged into erasure blocks, which represent the smallest grouping of memory cells that can be erased at a time. Garbage collection operations are carried out as background routines to periodically recycle the erasure blocks for reuse. A garbage collection operation generally includes searching the erasure block(s) for current version data, rewriting the current version data to a new location, and then applying an erasure operation to reset the memory cells. Erasure blocks are usually grouped into larger garbage collection units (GCUs) that incorporate erasure blocks from different dies and which can be erased and allocated as a unit.

Metadata structures are often used to track the locations of data blocks within the NVM. These structures can include a forward map and a reverse directory. The forward map generally provides a flash transition layer (FTL) to provide a conversion from logical addresses to physical addresses within the memory. The reverse directory may be stored locally with the data blocks described by the reverse directory, and facilitates a conversion from physical to logical addresses.

The forward map generally informs the system of where a particular block is located based on a logical address of the block. The reverse directory generally operates to inform the system of the logical addresses of the blocks at particular physical addresses (e.g., pages, bit offsets, etc.). The reverse directory is particularly useful during garbage collection since the local directory structure can quickly provide an indication of which user data blocks are written where in the local area of memory being accessed.

Traditionally, reverse directory footers have been written at certain memory locations within GCUs, such as after every few parity sets (stripes) or at the end of each GCU. Writing revere directory footers to preselected locations at memory boundaries makes the footers easy to locate and retrieve.

A problem arises when non-standard GCUs are utilized. For example, a system may be configured to normally use 32 dies in each GCU with each parity set writing a page to each die (for a total of 32 pages in the parity set). Due to failures or other operational constraints, it may become desirable to use a smaller number of dies for each GCU, such as 28 dies. In this case, placing the reverse directory footers in preselected locations may result in wasted space and undesired complexities in locating and using the directories.

Various embodiments of the present disclosure are generally directed to an apparatus and method for managing metadata in a non-volatile memory (NVM), such as but not limited to a flash memory in a solid-state drive (SSD). As explained below, some embodiments provide an NVM with a population of semiconductor memory dies across which garbage collection units (GCUs) are formed. In some cases, the dies may be divided into some number of NVM sets for the storage of user data by different owners in accordance with the so-called NVMe (Non-Volatile Memory Express) specification.

Logically addressable data blocks are arranged into parity sets for writing to the NVM along a write stream. An entry for a reverse directory footer structure is generated on-the-fly for each of the data blocks, with each entry describing a physical address at which the block is stored within a GCU. As the data blocks are streamed to the media, a buffer accumulates the entries and a counter counts the number of entries that have been accumulated. Once a predetermined number of entries are accumulated to provide a full ("complete") footer, the footer is introduced into the write stream for writing to the media at this sequential location in the stream.

In one non-limiting example, the data blocks are characterized as map units (MUs) each having 4096 bytes, B (4 KB) of user data. Each entry in the footer is configured to be 4 bytes in length to provide a metadata overhead ratio of nominally 1000:1. A total of 1024 entries are accumulated in each footer so that each footer has a nominal metadata content of 4 KB. Thus, a footer is inserted into the write stream at the conclusion of each set of 1024 blocks and describes the preceding 1024 blocks irrespective of physical location within the GCU. Straightforward detection and calculation techniques can be used to locate the footers within a given GCU.

In further embodiments, additional data structures such as ending footers can be written to facilitate the locations of the other footers within the GCU. Different metadata ratios and sizes of footers can be used for different NVM sets as desired. Mechanisms to counter the effects of rude power loss events (e.g., hard loss of power) can be implemented to further facilitate recovery.

Figure 1:
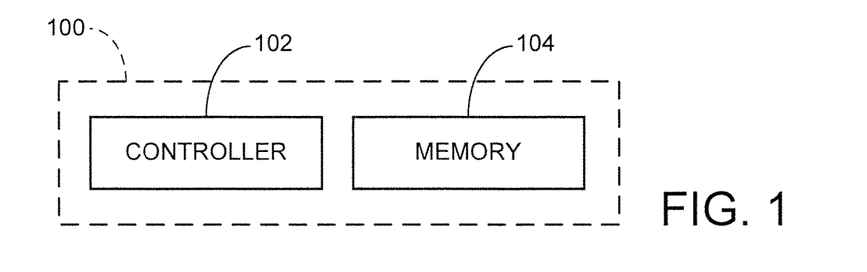
FIG. 1 provides a functional block representation of a data storage device in accordance with various embodiments.

These and other features and advantages of various embodiments can be understood beginning with a review of FIG. 1 which provides a functional block diagram of a data storage device 100. The device 100 has a controller 102 and a memory module 104.

The controller block 102 represents a hardware based and/or programmable processor based circuit configured to provide top level communication and control functions. The memory module 104 includes solid state non-volatile memory (NVM) for the storage of user data from a host device.

Figure 2:
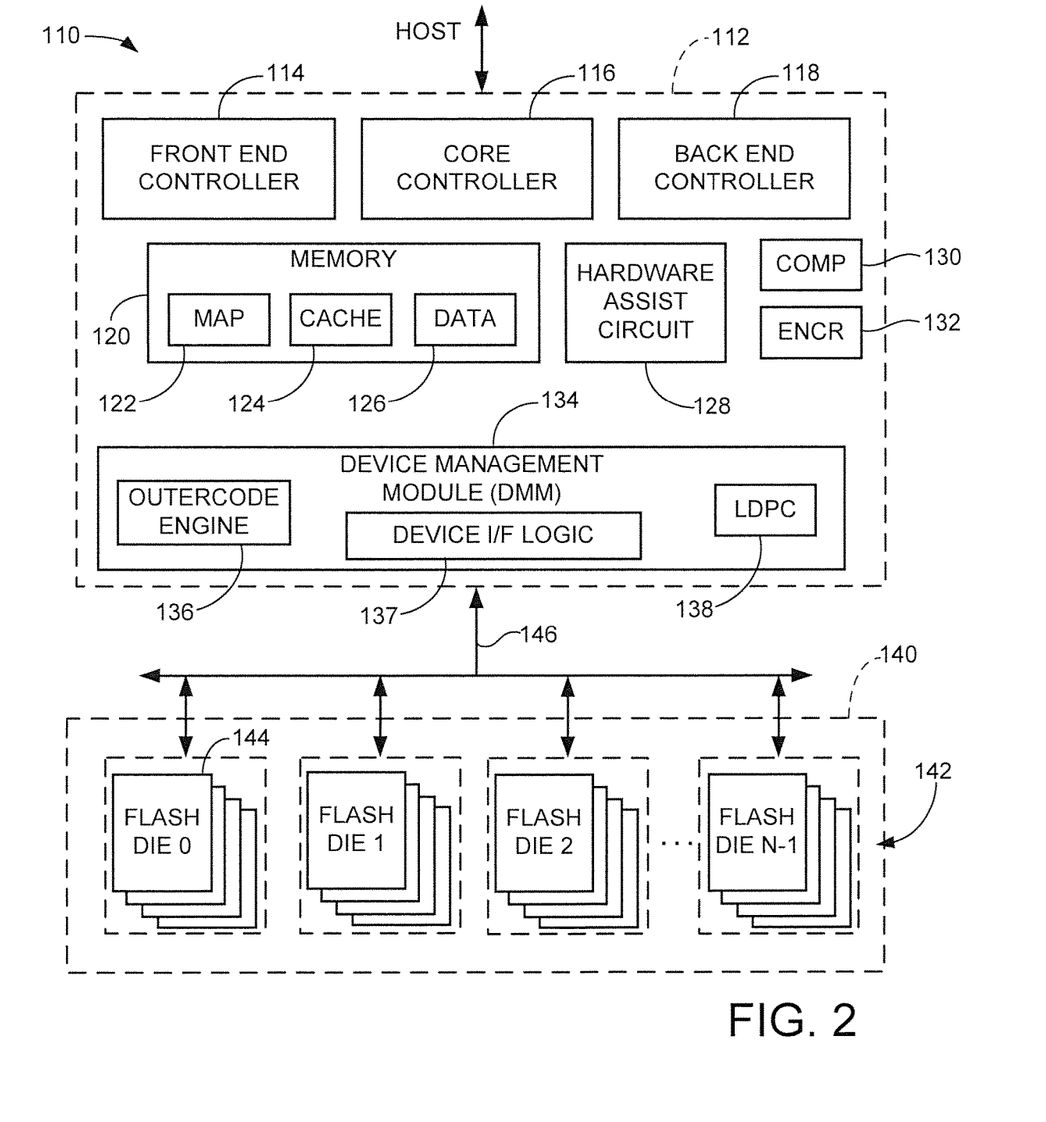
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more host devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each die set may form a portion of an NVMe namespace that may span multiple SSDs or be contained within a single SSD.

The SSD 110 includes a controller circuit 112 with a front end controller 114, a core controller 116 and a back end controller 118. The front end controller 114 performs host IT functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
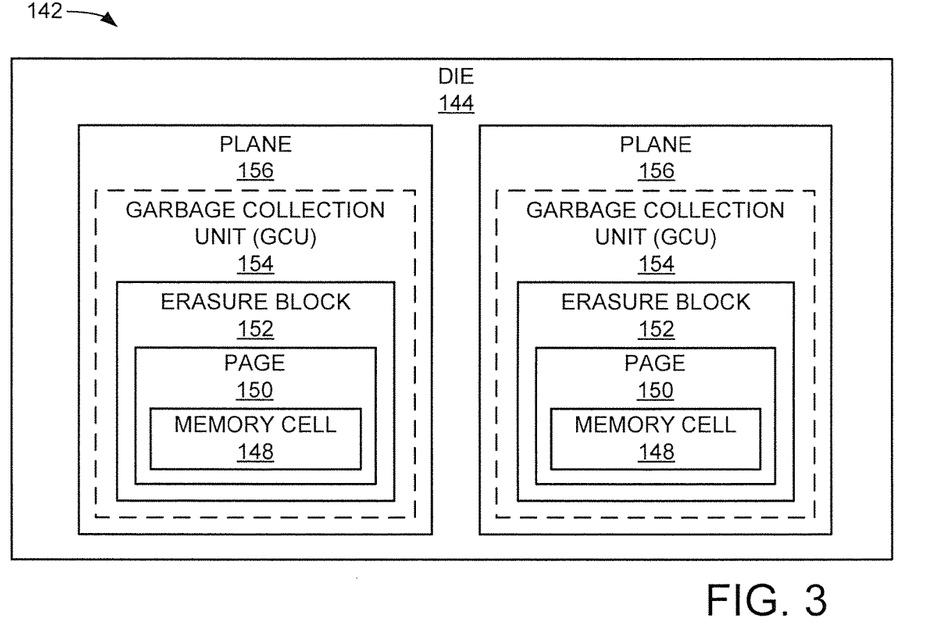
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical storage units that utilize erasure blocks across different dies as explained below. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
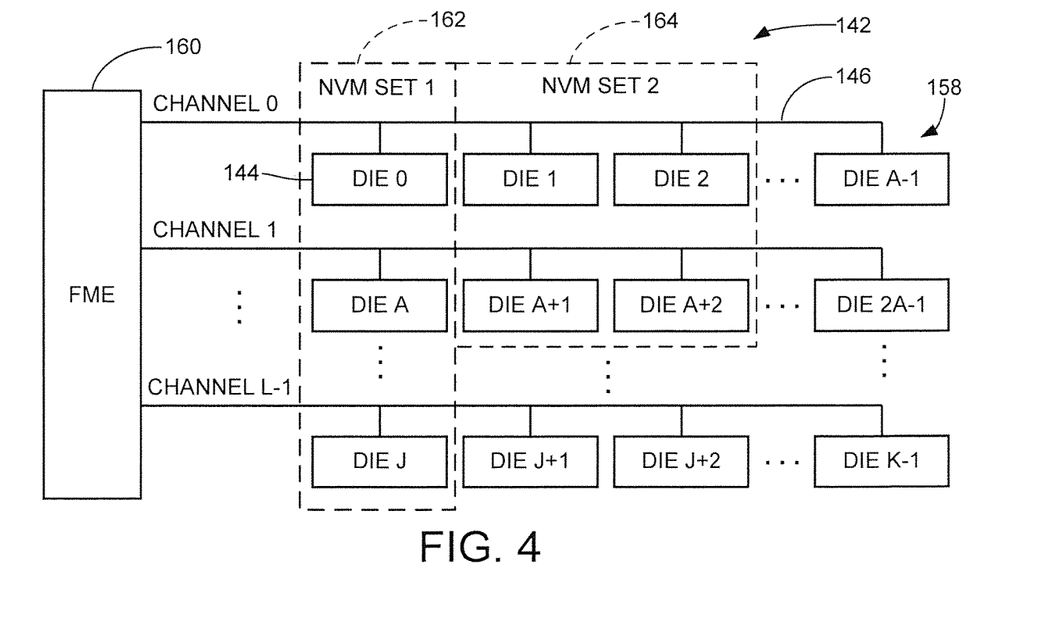
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. Flash memory electronics (FME) circuitry 160 of the flash memory module 142 controls each of the channels 146 to transfer data to and from the respective die groups 158. In one example, K is set to 128 dies, L is set to 8 channels, and each physical die group has 16 dies. In this way, any of the 16 dies physically connected to a given channel 146 can be accessed at a given time using the associated channel. Generally, only one die per channel can be accessed at a time.

In some embodiments, the various dies are arranged into one or more NVM sets. An NVM set, also referred to a die set, represents a portion of the storage capacity of the SSD that is allocated for use by a particular host (user/owner). NVM sets are established with a granularity at the die level, so that each NVMe (die) set will encompass a selected number of the available dies 144.

A first example NVM set is denoted at 162 in FIG. 4. This first set 162 uses a single die 144 from each of the different channels 146. This arrangement provides fast performance during the servicing of data transfer commands for the set since all eight channels 146 are used to transfer the associated data to service a host access command. A limitation with this approach is that if the set 162 is being serviced, no other NVM sets can be serviced during that time interval. While the set 162 only uses a single die from each channel, the set could also be configured to use multiple dies from each channel, such as four (4) dies per channel for a total of 32 dies.

A second example NVM set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple NVM sets at the same time, provided the sets do not share the same (e.g., an overlapping) channel 146.

Figure 5:
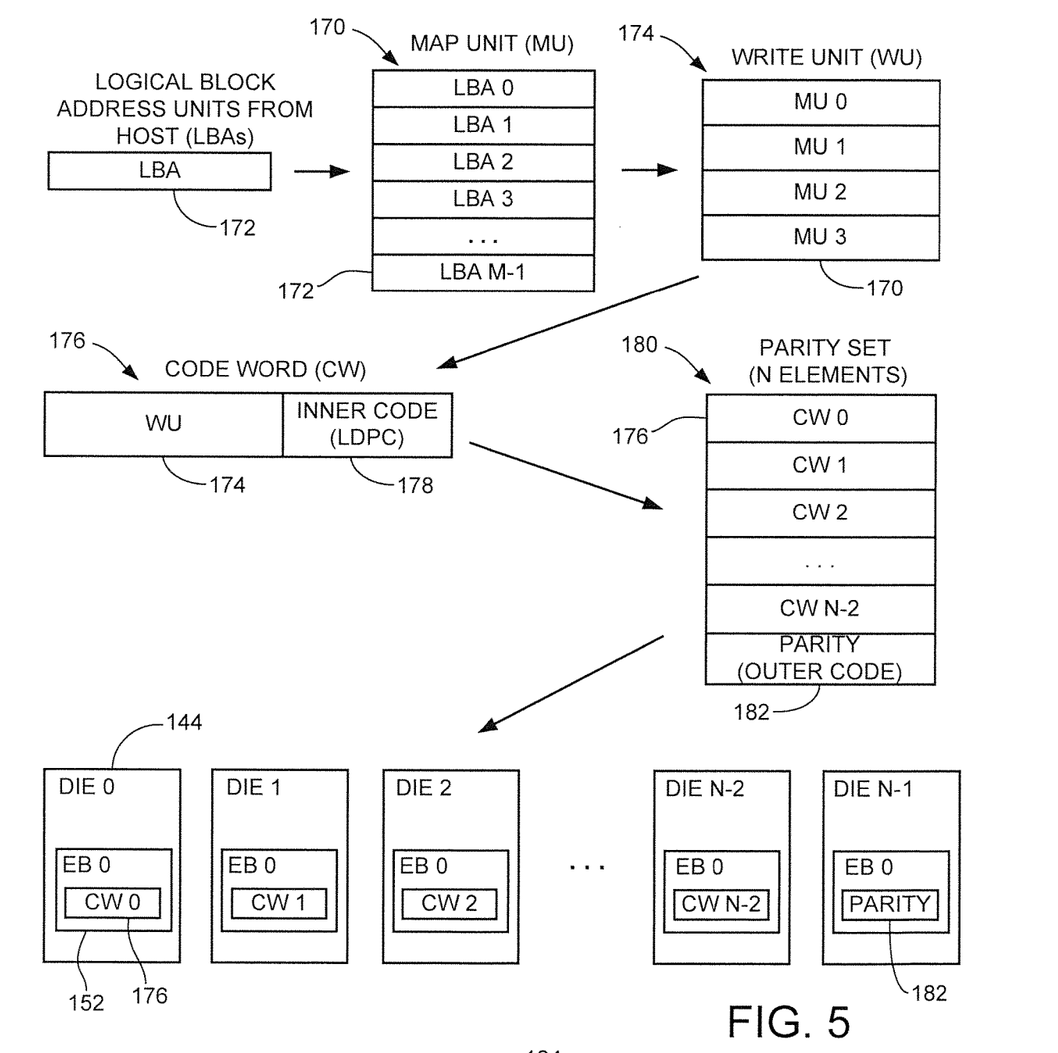
FIG. 5 illustrates a map unit (MU) as a data arrangement stored to the flash memory of FIG. 2.

FIG. 5 illustrates a manner in which user data are stored to the flash memory module 142 in accordance with some embodiments. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

As noted above, in one example each page 150 represents nominally 16 KB of user data capacity. Hence, each set of four (4) MUs 170 will be grouped together to form a write units (WU) 174 of nominally 16 KB of user data.

A code word (CW) 176 is formed by appending, to the WU 174, an inner code value 178. It is contemplated that the inner code constitutes low density parity check (LDPC) codes, although other error correction schemes can be used. The number of code bits will vary, but may be on the order of about 10 KB or so for 16 KB of user data, depending on the construction of the flash memory 142. As will be recognized, LDPC codes enable fast detection and correction of read errors during a read operation. The inner codes 178 may be generated by the LDPC module 138 (see FIG. 2) in preparation of writing of the WU 174 to the flash memory.

Some number of code words 176 are grouped together to form a parity set 180 having N elements. Nominally, the value N will be based on the number of erasure blocks 152 in a given GCU 154, although this is not necessarily required. For the present example, it is contemplated that N=32 although other numbers of elements can be used. As shown in FIG. 5, the parity set 180 will have N−1 code words 176 (e.g., N−1=31) plus an appended parity value 182. Each of the various code words 176 and the associated parity value 182 are written as a different page of data in the GCU. More particularly, the code words and parity values for a given parity data set may be written to the same page and same designated erasure block (e.g., EB 0) across the respective dies, as shown.

Figure 6:
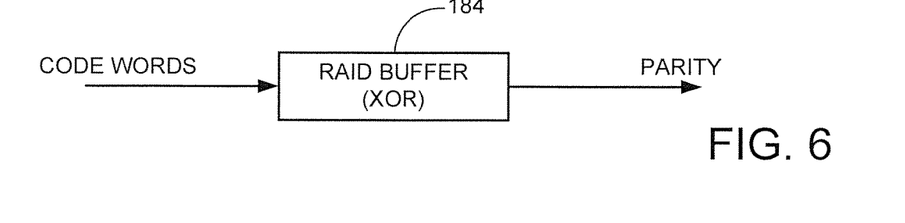
FIG. 6 shows the use of a buffer to generate the parity value in FIG. 5 in accordance with some embodiments.

The parity value 182 represents outer code and can take any number of forms. Without limitation, in one embodiment the parity value 182 represents the output of an exclusive-or (XOR) function applied to the N−1 code words 176. FIG. 6 shows a RAID buffer 184 configured to receive and accumulate the 31 code words 176 in each parity set 180 to generate the parity value 182. In this way, the data from the parity set can be reconstructed even in the event of a single die failure. It follows that nominally 16 KB of parity data protects (16 KB)(31)=496 KB of user data in each parity set, for an overhead ratio of about 3.2%.

The parity sets stored by the SSD 110 are managed using metadata. The metadata provide map structures to track the locations of various data blocks (e.g., MUs 170) to enable the SSD 110 to locate the physical location of existing data within the flash memory 142. During the servicing of a read command, it is generally necessary to locate the physical address within the flash memory 142 at which the most current version of a requested block (e.g., LBA) is stored, so that the controller can schedule and execute a read operation to return the requested data to the host.

During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Metadata structures are used by the SSD 110 to track the locations of data within the flash memory 142. These metadata structures take two primary forms: a forward map and a reverse directory.

Figure 7:
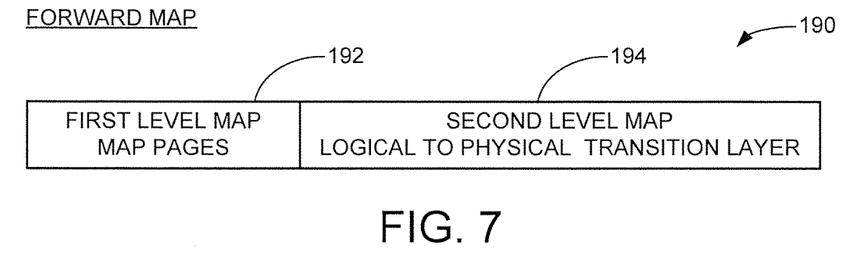
FIG. 7 shows an exemplary format for a forward map data structure used by the SSD in some embodiments.

FIG. 7 shows an example format for a forward map 190 used by the SSD 110 in some embodiments. A two-level map is depicted, although single level or other multi-level maps with three or more levels can be provided as desired.

The forward map 190 includes a first level map 192 and a second level map 194. The first level map 192 provides map pages to identify, for a given range of logical addresses, the entries in the second level map 194. The entries in the second level map 194 provide a flash transition layer (FTL) to generally provide a correlation between the logical addresses of various blocks (e.g., MUs) and the physical addresses at which the various blocks are stored (e.g., NVM set, die, plane, GCU, EB, page, bit offset, etc.).

Forward pointers may be written to the various entries such that, when accessing the map pages and FTL entries, a forward search may take place to locate the final, most current version of a given data block. Once this location is identified, the associated data can be retrieved, etc.

It is generally required that accurate map data be maintained in order to reconstruct the state of the system. A local copy of the map data (or portions thereof) may be maintained in local volatile memory for ease of use by the controller 112. From time to time, the map data may be updated and transferred to the flash memory to provide non-volatile data storage of the map information. The map data may be arranged into parity sets in a manner similar to that described above in FIG. 5 for the host user data written to the flash memory. This will include the periodic generation of map parity values using the buffer 184 of FIG. 6.

Figure 8:
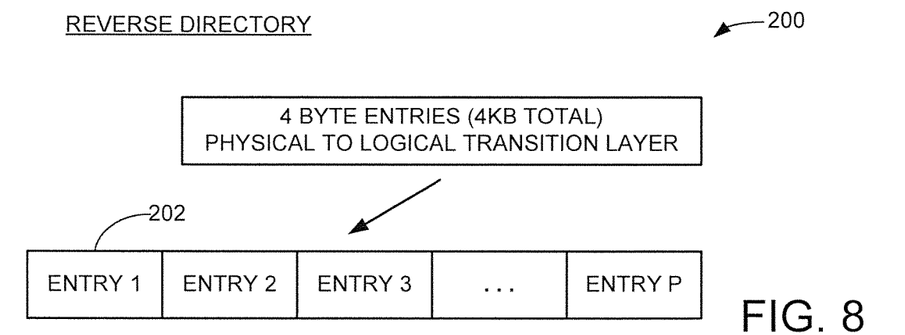
FIG. 8 is an exemplary format for a reverse directory footer data structure used by the SSD in some embodiments.

FIG. 8 shows an exemplary format for a reverse directory footer 200 in accordance with some embodiments. The reverse directory footer 200 is a data structure that is written with the data blocks (e.g., MUs 170) to the GCU at which the blocks are being written in order to provide a physical to logical transition layer for the SSD controller.

As shown in FIG. 8, the footer 200 is divided into N entries 202, with each entry describing a different one of the blocks 170 in the sequence. In some embodiments, each entry is 4 bytes (32 bits) in length, and a total of 1024 entries are incorporated into each footer (e.g., N=1024). This provides the footer 200 with an overall size of 4 KB, which equals the size of the MUs 170 and facilitates easy insertion of the footer into the memory. Stated another way, if each of the MUs 170 has a total of X bytes (e.g., 4096 bytes) of user data, and each entry 202 has a total of Y bytes (e.g., 4 bytes) of map data, then a total number of Z entries (e.g., 1024 entries) can be accumulated in each footer 200 (e.g., Z=X/Y) to provide the footer with the same total number of bytes (e.g., X bytes) as each MU.

Multiple footers 200 will be written to each GCU, with each describing the previous N (e.g., 1024) blocks in the sequence by physical location (e.g., page, offset, etc.). When data compression is applied to the data blocks, the footer entries can identify the starting bit and the overall bit length, etc. of each block.

Figure 9:
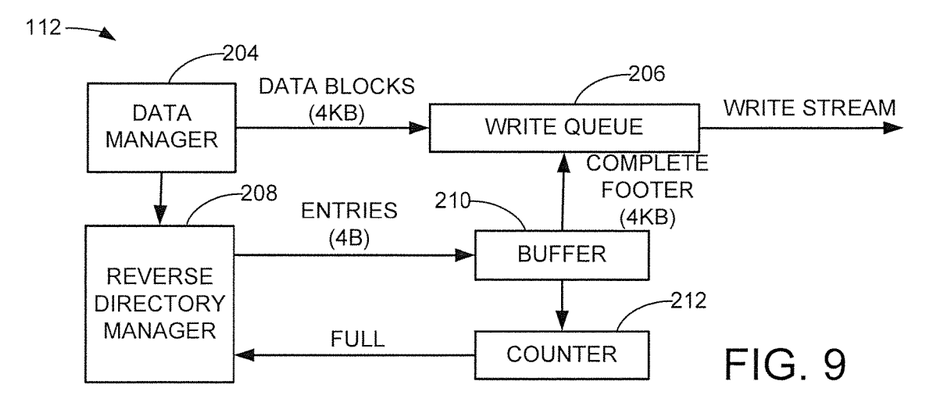
FIG. 9 is a functional block diagram of a reverse directory manager circuit operated in accordance with some embodiments.

FIG. 9 shows a functional representation of further aspects of the controller 112 in some embodiments. A data manager circuit 204 assembles and forwards the data blocks (e.g., MUs 170 of FIG. 5) to a write queue 206 to generate a write stream for writing to the flash memory. A reverse directory manager circuit 208 generates the corresponding entries 202 from FIG. 8, one for each data block. The entries are forwarded by the reverse directory manager 208 to a buffer 210 which accumulates the entries into sequential order.

A counter circuit 212 counts the number of entries that have been accumulated by the buffer. Once a predetermined count is reached, such as 1024 entries, the counter signals the reverse directory manager 208 which, in turn, directs an insertion of the complete footer into the write stream using the write queue 206. It will be appreciated that the actual insertion of the complete footer can be carried out a number of ways, including by placing the footer into a write buffer of the queue or by forwarding the footer directly to the next downstream process.

Figure 10:
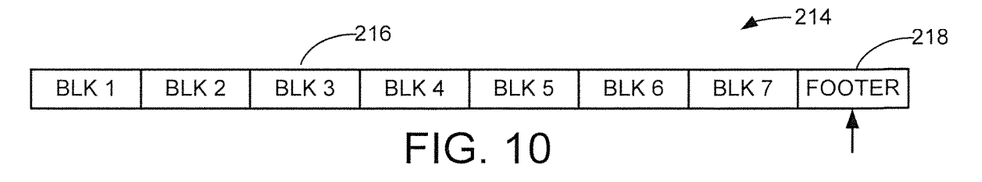
FIG. 10 shows insertion of a footer into an eight (8) block write unit in some embodiments.

FIG. 10 shows a write unit (WU) 216 similar to the WU discussed above in FIG. 4. The WU has eight slots to accommodate up to eight (8) MUs 216 each having nominally 4 KB of user data. In this example, the reverse directory manager 208 arranges to insert a complete footer 218 into the WU 216 so that the WU has seven MUs and one footer. An advantage to this approach is that the footer can be incorporated into a selected parity set and the parity data value (see FIG. 5) can be used to provide error protection for the footer contents.

Figure 11:
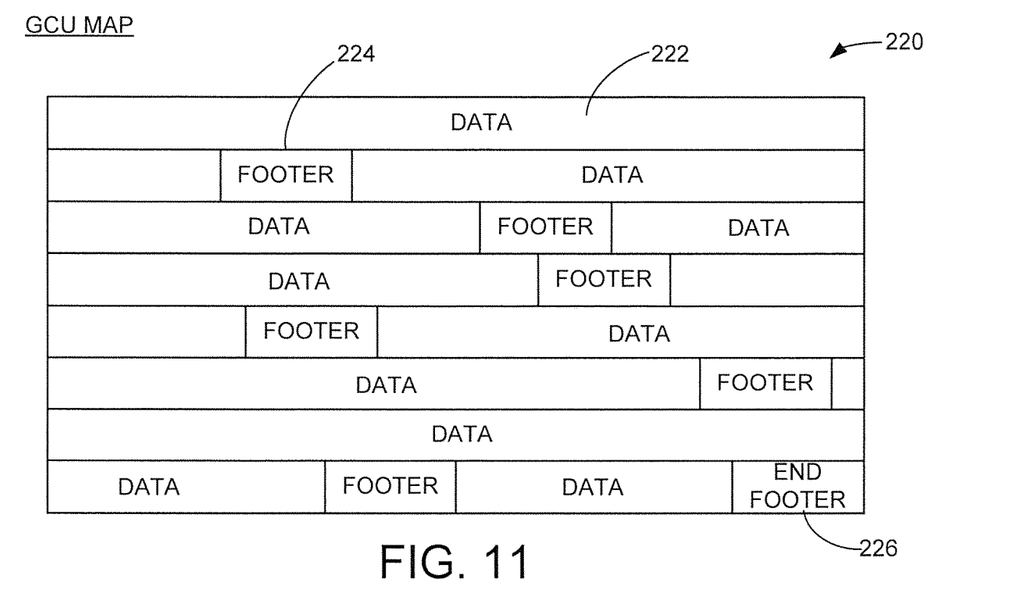
FIG. 11 shows an example placement of footers within a garbage collection unit (GCU) using the manager of FIG. 9.

FIG. 11 is a schematic depiction of a selected GCU 220 that uses footers such as 200 inserted into the write stream of FIG. 9. It will be appreciated that the diagram in FIG. 10 is merely illustrative and simplified to show the overall flow. The GCU 220 in this case is contemplated as having a non-standard number of semiconductor dies 144 as compared to the standard number of elements in each parity set. For example, each parity set 180 may be arranged to write 32 elements (31 code words 176 plus a parity value 178) as depicted in FIG. 5, but the total number of dies in each GCU is less than 32, such as 28-31. In such case, each parity set is slightly longer than a single "row" of the GCU, leading to the data generally wrapping around rather than extending across the normal 32 die boundaries.

To this end, FIG. 11 shows sections of data 222 representing the various parity sets that are successively written to the GCU. Footers are represented at 224. Locating the footers 224 can be carried out by locating the start of a set of user data blocks and counting forward (or backward) such that the specified number of data blocks is located between each adjacent pair of footers. In some cases, an end footer 226 can be provided at the end of the GCU 220. The end footer 226 can provide additional information regarding the location(s) of the various footers 224 within the GCU.

Figure 12:
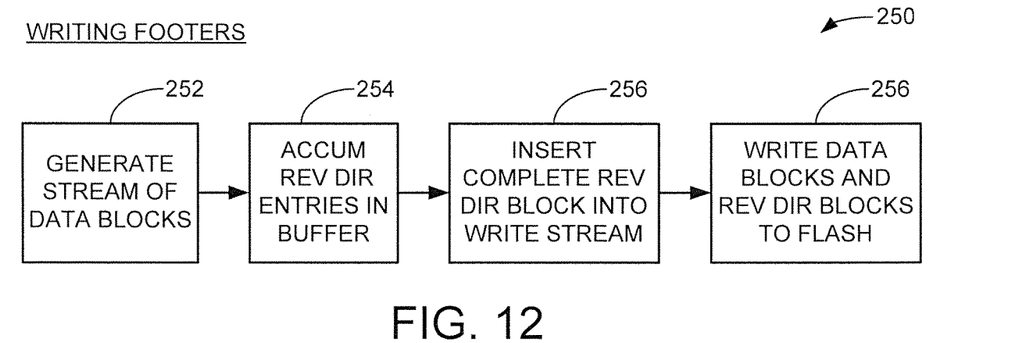
FIG. 12 is a sequence diagram showing a manner in which the footers of FIG. 11 can be written in some embodiments.

FIG. 12 shows a sequence diagram 250 for a writing footer operation. This is carried out by the circuitry of FIG. 9 during normal data transfer operations. A stream of data blocks is initially generated at block 252 for writing. It is contemplated that the blocks will be user data blocks, although other forms of data, such as map metadata, can also be generated for writing.

A number of reverse directory entries are generated at block 254, with one entry for each of the data blocks in the stream. These entries are accumulated in a buffer. As noted above, in some embodiments the data blocks will be 4 KB and the entries will be 4 bytes each. Other respective sizes can be used as desired.

Block 256 indicates the total number of entries in the buffer has reached the predetermined number (in this case, 1024) to form a complete footer. At this point, the complete footer is inserted into the write stream at an appropriate location, such as denoted above in FIG. 10. Block 258 then shows that the data blocks and the complete footer are written to the flash memory, providing the embedded footer arrangement such as shown in FIG. 11.

Figure 13:
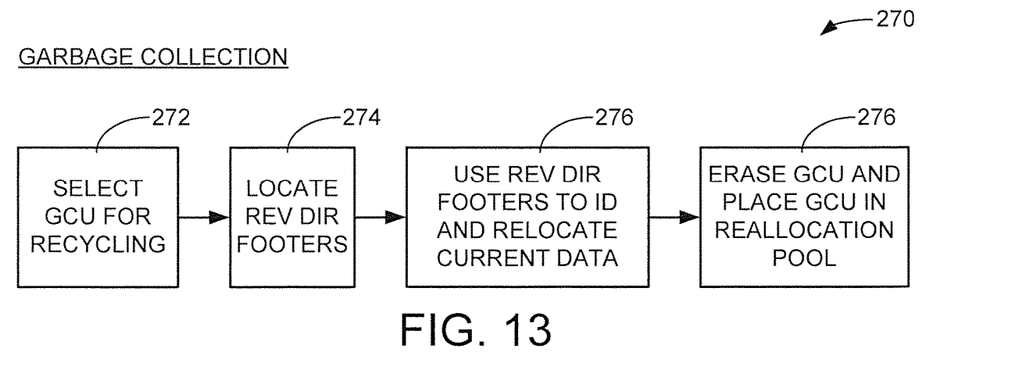
FIG. 13 shows a sequence diagram to illustrate a manner in which the footers of FIG. 11 can be used in some embodiments.

FIG. 13 shows a sequence diagram 270 for a garbage collection routine carried out in some embodiments. As noted above, the footers are of particular utility during garbage collection as the footers help the system quickly determine which current version data blocks need to be relocated prior to the erasure operation.

At block 272, a particular GCU is selected for recycling (garbage collection). The reverse directory footers are located within the selected GCU at block 274, and used at block 276 to identify the current version data blocks. Reference to the forward map may be used as part of this process. Once the current version data blocks have been relocated to a new GCU, the selected GCU is erased and placed into a reallocation pool for future use, block 278.

It will now be appreciated that the various embodiments present a number of benefits over the art. Providing a reverse directory manager circuit to generate and locate metadata structures such as reverse directory footers within the data structures (GCUs) at predetermined locations within the block sequence frees the system from complexities associated with attempting to locate the structures at particular locations in the memory. Reference locations are thus relative to the data, not the physical memory. The approach also facilitates the use of non-standard GCUs with fewer than the normal number of dies.

While not necessarily required, the use of separate and distinct map portions for each of a number of different sets can enable more efficient management of the metadata used to control data transfers with each set while maintaining deterministic performance of the SSD or other data storage device. While the various embodiments have been described in terms of an SSD in an NVMe environment, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
forming a write stream of user data blocks to be written to a non-volatile memory (NVM), each user data block comprising X kilo-bytes (KB) of user data;
generating an entry of a reverse directory footer for each user data block in the write stream to describe a physical address in the NVM at which the corresponding user data block is to be stored, each entry comprising X bytes of footer data;
accumulating the entries of the reverse directory footer in a buffer memory; and
inserting the accumulated entries from the buffer memory into the write stream responsive to a count of the entries in the buffer memory reaching 1024 entries, the inserted entries forming a complete footer data structure.

2. The method of claim 1, further comprising sequentially writing, to the NVM, the user data blocks described by the complete footer data structure followed by the complete footer data structure.

3. The method of claim 1, wherein the NVM comprises a plurality of semiconductor memory dies, wherein a garbage collection unit (GCU) is formed by logically associating at least one erasure block from each of a subset of the dies, and wherein the user data blocks and the reverse directory footer are written to the GCU.

4. The method of claim 3, wherein the user data blocks are written as parity sets comprising N total elements with N−1 data blocks plus a parity value to provide error protection for the N−1 data blocks, and the complete footer data structure is inserted among the user data blocks in a selected parity set.

5. The method of claim 4, wherein the GCU comprises N erasure blocks.

6. The method of claim 4, wherein the GCU comprises N−1 erasure blocks.

7. The method of claim 3, further comprising performing a garbage collection operation upon the GCU by locating the complete footer data structure, using the located complete footer data structure to identify at least one user data block described thereby of current data, relocating the at least one user data block to a second GCU and performing an erasure operation upon the erasure blocks of the GCU.

8. The method of claim 1, wherein the NVM comprises a plurality of semiconductor memory dies, and the method further comprises forming a plurality of die sets by grouping together different combinations of the dies, each die set configured to store user data associated with a different user.

9. The method of claim 1, further comprising writing a plurality of spaced-apart reverse directory footer structures to a garbage collection unit (GCU) of the NVM, wherein each successive pair of first and second reverse directory footer structures in the GCU are separated by an intervening number of user data blocks that are described by the second reverse directory footer structure.

10. The method of claim 1, wherein the NVM is a NAND flash memory of a solid-state drive (SSD).

11. An apparatus comprising:
a non-volatile memory (NVM) comprising a plurality of semiconductor memory dies;
a data manager circuit configured to form a write stream of user data blocks to be written to a garbage collection unit (GCU) of the NVM;
a reverse directory manager circuit configured to generate an entry of a reverse directory footer for each user data block in the write stream to describe a physical address in the GCU at which the corresponding user data block is to be stored; and
a buffer memory configured to accumulate the entries generated by the reverse directory manager circuit until a total predetermined number of entries is reached to form a complete footer data structure, the reverse directory manager circuit further configured to insert the complete footer data structure into the write stream for writing to the GCU with the user data blocks, the complete footer data structure having an overall size that corresponds to an overall size of each of the user data blocks; and
a write circuit configured to, responsive to receipt of the write stream, write a plurality of the complete footer data structures and the associated user data blocks to the GCU so that each successive pair of first and second complete footer data structures are separated by an intervening number of user data blocks described by the second complete footer data structure.

12. The apparatus of claim 11, wherein the user data blocks are written as parity sets each comprising N total elements with N−1 data blocks plus a parity value to provide error protection for the N−1 data blocks, and the complete footer data structure is inserted among the N−1 data blocks.

13. The apparatus of claim 12, wherein the GCU comprises N erasure blocks, each erasure block constituting a smallest amount of the NVM that can be erased at a time, each of the N erasure blocks disposed in a different semiconductor die of the NVM.

14. The apparatus of claim 11, wherein the data manager circuit is further configured to perform a garbage collection operation to recycle the GCU by locating the complete footer data structure within the GCU, using the located complete footer data structure to identify at least one user data block described thereby of current data, relocating the at least one user data block to a second GCU and performing an erasure operation upon the erasure blocks of the GCU.

15. The apparatus of claim 11, wherein the NVM is a NAND flash memory of a solid-state drive (SSD).

16. A solid-state drive (SSD), comprising:
a non-volatile memory (NVM) characterized as a flash memory comprising a plurality of semiconductor memory dies, each die comprising flash memory cells arranged into a plurality of erasure blocks with each erasure block constituting a smallest grouping of the flash memory cells that can be concurrently erased;
a controller circuit configured to form a garbage collection unit (GCU) by grouping together a selected erasure block from each of a subset of the dies in the NVM, the GCU allocated and erased as a unit;
a data manager circuit configured to form a write stream of user data blocks to be written to the GCU, each user data block having X total bytes of user data;
a reverse directory manager circuit configured to generate an entry of a reverse directory footer for each user data block in the write stream to describe a physical address in the GCU at which the corresponding user data block is to be stored, each entry having Y total bytes of map data; and
a buffer memory configured to accumulate the entries generated by the reverse directory manager circuit until a total number of Z entries is reached to form a complete footer data structure where Z=X/Y, the reverse directory manager circuit further configured to insert the complete footer data structure into the write stream for writing to the GCU with the user data blocks, the complete footer data structure having an overall size that corresponds to an overall size of each of the user data blocks.

17. The SSD of claim 16, wherein the dies are arranged into at least one namespace in accordance with the NVMe (Non-Volatile Memory Express) specification, the namespace assigned for storage of user data from a selected user, and wherein the GCU extends across dies in the namespace.

18. The SSD of claim 16, wherein X is 4096, Y is 4 and Z is 1024.

19. The SSD of claim 16, further comprising a write circuit which receives the write stream and, in response thereto, writes a plurality of the complete footer data structures and the associated user data blocks to the GCU so that each successive pair of first and second complete footer data structures are separated by an intervening number of user data blocks described by the second reverse directory footer structure.

20. The SSD of claim 16, wherein the controller circuit is further configured to generate a forward map in a memory which provides a flash translation layer (FTL) to associate logical addresses of the data blocks to physical addresses in the NVM.

* * * * *